United States Patent
Spencer et al.

(10) Patent No.: US 11,474,319 B2
(45) Date of Patent: Oct. 18, 2022

(54) OPTICAL SYSTEM WITH AT LEAST ONE ALIGNED OPTICAL CELL AND ASSOCIATED METHOD

(71) Applicant: EAGLE TECHNOLOGY, LLC, Melbourne, FL (US)

(72) Inventors: Richard Spencer, Melbourne, FL (US); Carrigan L. Braun, West Melbourne, FL (US); Christopher A. Corey, Palm Bay, FL (US); Randall K. Morse, Palm Bay, FL (US); Peter A. Wasilousky, Indialantic, FL (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 709 days.

(21) Appl. No.: 16/439,226

(22) Filed: Jun. 12, 2019

(65) Prior Publication Data
US 2020/0393633 A1      Dec. 17, 2020

(51) Int. Cl.
*G02B 7/00* (2021.01)
*G02B 7/02* (2021.01)

(52) U.S. Cl.
CPC ............. *G02B 7/003* (2013.01); *G02B 7/023* (2013.01)

(58) Field of Classification Search
CPC ......... G02B 7/003; G02B 7/023; G02B 27/62
See application file for complete search history.

(56) References Cited

U.S. PATENT DOCUMENTS

| 5,210,648 | A | * | 5/1993 | Bedzyk | ................ G02B 7/023 359/813 |
| 5,854,867 | A | | 12/1998 | Lee et al. | |
| 6,430,337 | B1 | | 8/2002 | Bergmann et al. | |
| 7,184,136 | B2 | | 2/2007 | McHugh | |
| 7,511,258 | B2 | | 3/2009 | Bowen et al. | |
| 9,958,710 | B1 | | 5/2018 | Morse et al. | |
| 9,958,711 | B1 | | 5/2018 | Morse et al. | |
| 2004/0057686 | A1 | | 3/2004 | Steinberg et al. | |
| 2018/0173027 | A1 | | 6/2018 | Morse et al. | |

(Continued)

FOREIGN PATENT DOCUMENTS

| JP | 2017032950 | 2/2017 |
| RU | 2015139131 | 3/2017 |

OTHER PUBLICATIONS

SPIE, 2015 Optics + Photonics Technical Summaries, Conference & Courses: Aug. 9-13, 2015; Exhibition: Aug. 11-13, 2015, San Diego Convention Center; San Diego, CA USA, 9544-4; 9544-10; 9547-39; 9582; 764 pages; www.spie.org.op.

*Primary Examiner* — James C. Jones
(74) *Attorney, Agent, or Firm* — Allen, Dyer, Doppelt + Gilchrist, P.A.

(57) ABSTRACT

The optical system includes a base having a groove and an adjacent slot therein. The system also includes at least one optical cell slidably alignable along the groove, and at least one clamp comprising a lower end and an upper end. The lower end is slidably alignable along the slot and is secured at a set location so that the upper end secures the at least one optical cell along the groove. The slot may extend parallel to the groove. The clamp may include at least one preloaded fastener arrangement securing the lower end of the clamp to the base. The preloaded fastener may include a bolt, a spring biasing the bolt, and a threaded backing plate within the slot and receiving the bolt.

24 Claims, 5 Drawing Sheets

(56) References Cited

U.S. PATENT DOCUMENTS

2018/0203265 A1 7/2018 Morse et al.
2018/0203325 A1 7/2018 Wasilousky et al.
2018/0299745 A1 10/2018 Morse et al.

* cited by examiner

OPTICAL SYSTEM WITH AT LEAST ONE ALIGNED OPTICAL CELL AND ASSOCIATED METHOD

TECHNICAL FIELD

The present invention relates to the field of optical assemblies, and, more particularly, to an optical alignment system for optical cells and related methods.

BACKGROUND

The manufacture of optical assemblies is often expensive and time consuming. This is due in part to the technical challenge associated with the alignment of optical components. In particular, the spatial relationship of various optical components, such as lasers, filters, tunable filters, and switches are required to be precisely aligned. Accordingly, an optical bench is often used to provide a platform to facilitate the mounting of these various optical components in precise spatial relationship to each other to achieve optical alignment.

For example, current reconfigurable optical benches that may be used for prototype systems include cage systems and optical breadboard plates, which may have flexible positioning of optical components, or optical cells, such as cylindrical lens cells. However, these types of reconfigurable optical benches trade reconfigurability for precision and reliability. Therefore, they may have limited applicability.

The current optical benches that may provide high precision require significant redesign to accommodate changes in optical requirements and are not reconfigurable. These types of high precision optical benches may include a V-groove base plate. They also have discreet mounting points to achieve the desired high precision placement of the optical components.

Despite the existence of such configurations, further advancements in optical systems may be desirable in certain applications.

SUMMARY

An optical system includes a base having a groove and an adjacent slot therein. The optical system also includes at least one optical cell slidably alignable along the groove, and at least one clamp comprising a lower end and an upper end. The lower end is slidably alignable along the slot and is secured at a set location so that the upper end secures the at least one optical cell along the groove.

The slot may extend parallel to the groove, for example. The at least one clamp may include at least one preloaded fastener arrangement securing the lower end of the clamp to the base. The preloaded fastener may include a bolt, a spring biasing the bolt, and a threaded backing plate within the slot and receiving the bolt. The slot may have an inverted T shape, for example, and the groove may have tapered sidewalls, for example.

The optical system may also include at least one clamp fastener removably securing the upper end to the lower end. The at least one optical cell may include at least one cylindrical lens cell rotatable within the groove upon loosening of the at least one clamp fastener. The lower end of the clamp may have an adjustment tool receiving passageway therein, and the lower end of the clamp may define an alignment fixture receiving slot with adjacent portions of the base.

Another aspect relates to a method for making the optical system. The method may include forming a base having a groove and an adjacent slot therein, slidably aligning at least one optical cell along the groove, and slidably aligning a lower end of at least one clamp along the slot to a set location and using an upper end of the at least one clamp to secure the at least one optical cell along the groove.

The lower end of the clamp may have an adjustment tool receiving passageway therein and may define an alignment fixture receiving slot with adjacent portions of the base. The method may also include using an adjustment tool and an alignment fixture in cooperation with the adjustment tool receiving passageway and alignment fixture receiving slot, respectively, to set the clamp to the set location.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in other embodiments.

The optical system described herein and generally designated 100, addresses the demand for an opto-mechanical system that can satisfy tightly controlled telecentricity, distortion, and spot size requirements while also having high rigidity and high precision placement. In addition, the optical system 100 has adjustability to compensate for lens variation from nominal dimensions.

Figure 1:
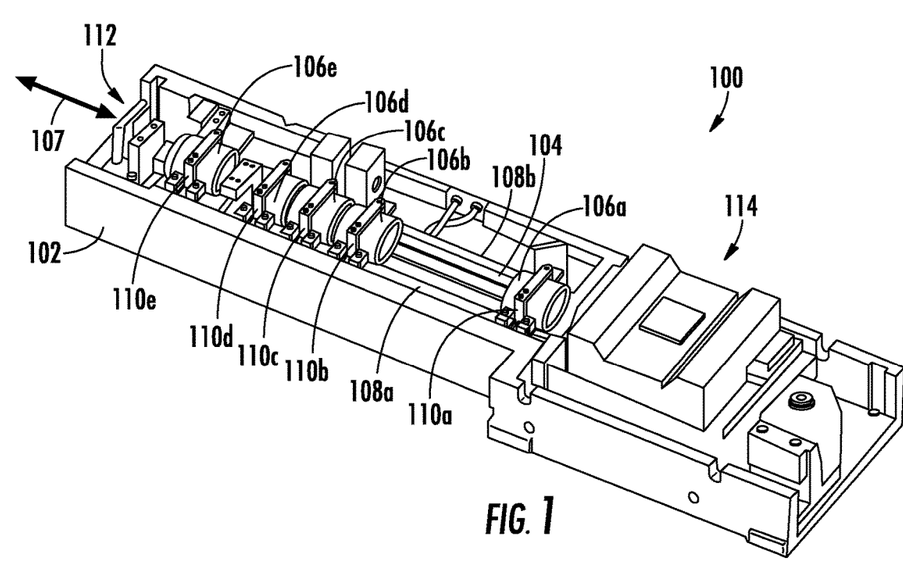
FIG. 1 is a perspective view of an optical system according to the invention.
Figure 2:
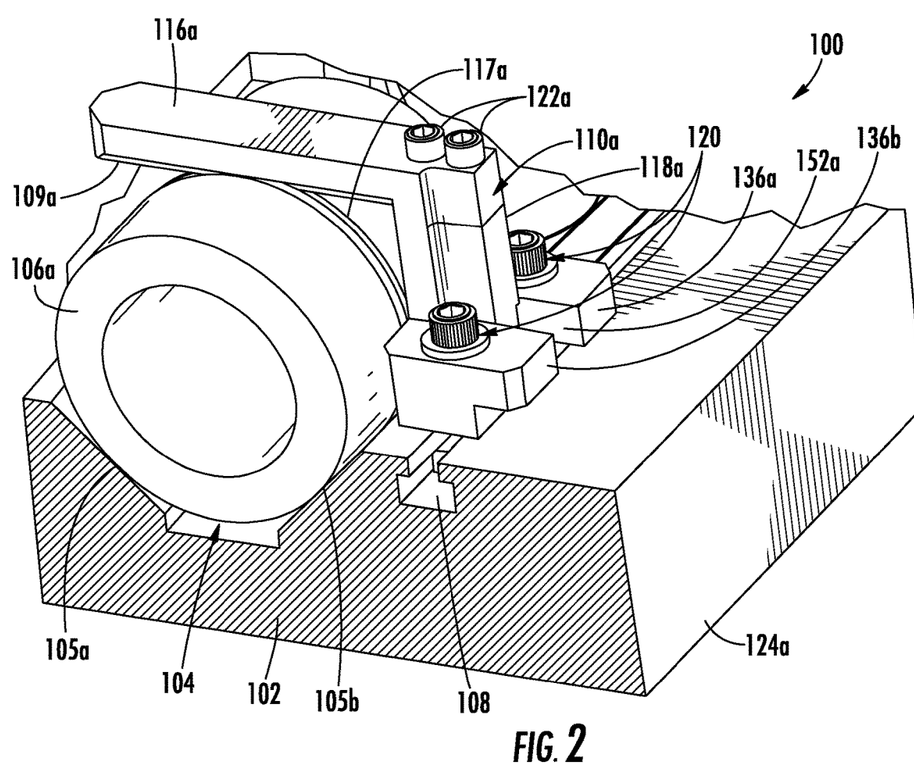
FIG. 2 is an enlarged fragmentary view of the optical system of FIG. 1.

Referring initially to FIGS. 1 and 2, the optical system 100 includes a base 102 having a groove 104 therein with tapered sidewalls 105a, 105b. A first optical component such as an optical cell 106a is positioned within the groove 104 and has an outer periphery in contact with the tapered sidewalls 105a, 105b. The optical cell 106a may be a cylindrical lens cell, for example, although in other embodiments the optical cell may be filter, optical source, optical receiver, etc. that is accurately aligned along an optical axis 107 as will be appreciated by those skilled in the art.

The tapered sidewalls 105a, 105b (FIG. 2) have a slanted angle relative to a top surface of the base 102. The angle and spacing depends, in part, on a diameter of the alignable optical cells 106a-106e (FIG. 1) that are selected to be used with the optical system 100. In addition, the groove 104 may be V-shaped or truncated as shown in FIG. 2 as the optical cells 106a-106f are not supported by a bottom surface of the groove 104. Accordingly, the use of the term V-shaped as used herein should be understood to mean a full V-shaped groove as well as a truncated V-shaped groove as shown in FIG. 2.

Although the optical system 100 illustratively comprises five alignable optical cells 106a-106e, those of skill in the art can appreciate that more or less optical cells may be aligned and secured to the base 102. The base 102 serves to support and precisely align any number of the optical cells along the optical axis 107. Accordingly, the base 102 comprises a rigid material that may be machined to define the groove 104.

The optical cells 106a-106e are positioned in spaced relation along the optical axis 107 and each can be adjusted or aligned with high precision, such as within five to ten microns, for example, as discussed in more detail below. An optical source 112 is positioned at a first end of the optical system 100 and an optical target 114 is positioned at an opposing second end of the optical system.

The optical target 114 may comprise an acoustic-optic modulator, in turn, coupled to an ion trap (not shown), as in a quantum computing device, for example. In another example, the optical target may be a semiconductor mask to perform photolithographic patterning, for example. In still another example, the optical target may be a micromachining workpiece. It should be noted that the optical system 100 may be used with other optical targets in different embodiments as well.

Examples of acousto-optic modulator devices and similar acousto-optic systems are disclosed in commonly assigned U.S. Pat. Nos. 9,958,710 and 9,958,711; and published U.S. Applications 2018/0173027, 2018/0203265, 2018/0203325, and 2018/0299745, the disclosures of which are hereby incorporated by reference in their entireties. Accordingly, the optical system 100 allows work over a large spectrum. The optical system 100 may accordingly provide advantages with respect to numerous different types of optical targets.

The base 102 also includes a longitudinally extending slot 108 adjacent to the groove 104. The slot 108 extends parallel to the groove 104 and in spaced relation therefrom, and may have an inverted T shape. As those of skill in the art will appreciate, it should be understood that the slot 108 may have other shapes as well.

The optical system 100 includes clamps 110a-110e for securing the respective optical cells 106a-106e within the groove 104 at the respective desired, or set, locations. Each of the clamps 110a-110e has a lower end and an upper end. For example, clamp 110a includes a lower end 118a, as shown in FIG. 2, that is slidably positioned along the slot 108, and an upper end 116a securing the optical cell 106a along, or partially within, the groove 104 at the desired, or set, location. The upper end 116a of the clamp 110a, for example, extends over the groove 104 to engage a surface of the optical cell 106a. A lower surface of the upper end 116a extending over the groove 104 illustratively has a beveled edge 109a configured to matingly engage a concentric groove 117a defined on the surface of the optical cell 106a.

Clamp fasteners 122a are used for removably securing the upper end 116a of clamp 110a to its lower end 118a. Accordingly, the upper end 116a of the clamp 110a can be loosened so that the lens cell 106a can be rotated or removed, all without moving the lower end 118a and disturbing its precise location. Each of the other clamps 110b-110e may similarly secured together using respective clamp fasteners.

In addition, the clamp 110a illustratively has a pair of preloaded fastener arrangements 120 securing the respective lower end of the clamp to the base 102 as will be explained with further reference to FIG. 3.

Figure 3:
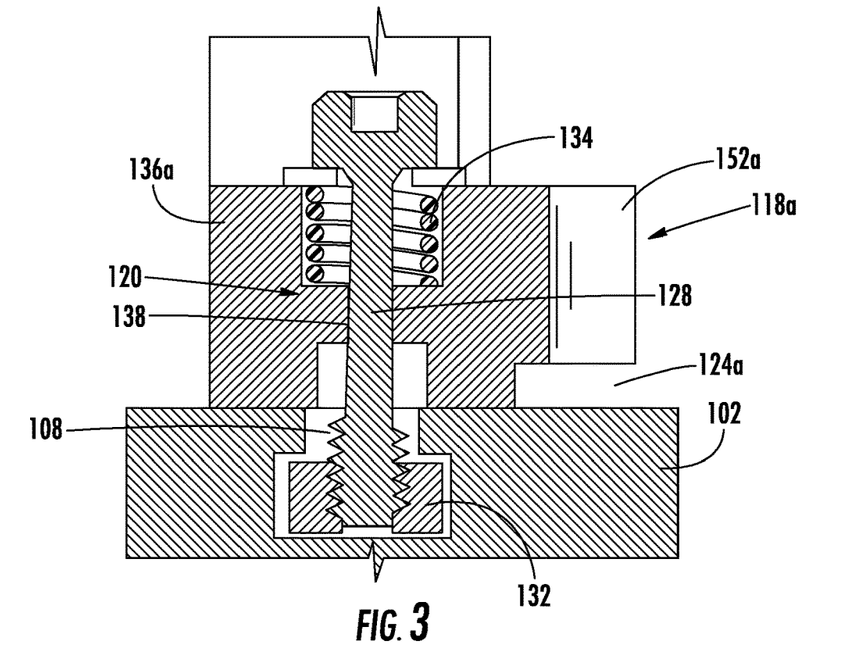
FIG. 3 is a cross sectional view of the lower end of the clamp and preloaded fastener arrangement of the optical system of FIG. 1.

Referring now additionally to FIG. 3, the preloaded fastener arrangement 120 for securing the lower end 118a of the clamp 110a to the base 102 is further explained. Each of the clamps 110a-110f may be similarly secured using the preloaded fastener arrangements 120. The preloaded fastener arrangement 120 may include a bolt 128, a spring 134 biasing the bolt 128 upward, and a threaded backing plate 132 receiving the bolt 128. The slot 108 illustratively has an upper narrow channel portion and a lower wide channel portion, that is, an inverted-T shape. The threaded backing plate 132 is slidably received within the lower wide channel portion of the slot 108. A single threaded backing plate 132 is used for both bolts 128 and associated springs 134 in the illustrated embodiment.

The clamp 110a further comprises a pair of flanges 136a, 136b at its lower end 118a with respective overhanging portions positioned above the slot 108a, and the pair of flanges each have a borehole 138 therethrough for respective bolts 128.

Each of the optical cells 106a-106e are similarly adjusted to the respective desired location and secured using respective clamps 110a-110e and preloaded fastener arrangements 120. In addition, the lower end of each of the clamps 110a-110e defines an alignment fixture receiving slot 124a with adjacent upper portions of the base 102, which is discussed in more detail below.

Figure 4:
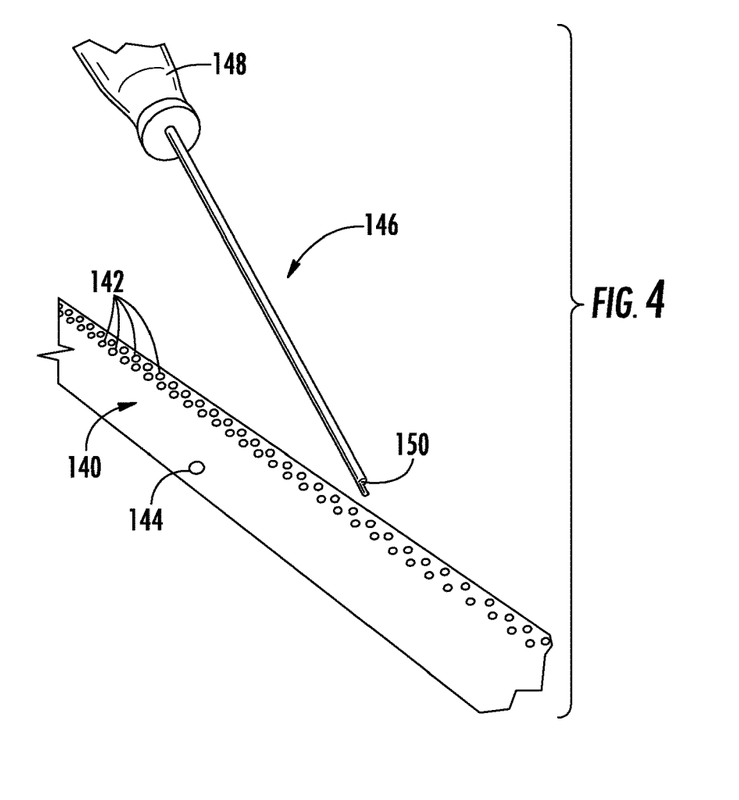
FIG. 4 is a perspective view of an alignment fixture and an adjustment tool that can be used with the optical system of FIG. 1.

Referring now to FIG. 4, an adjustment tool 146 for use with the optical system 100 is explained. The adjustment tool 146 has a handle 148 on a first end and a cam 150 on a second end. The alignment fixture 140 includes a plurality of adjustment apertures 142 for receiving the cam 150. Another aperture 144 may be used to secure the fixture 140 to the base 102. In operation the cam 150 is configured to be inserted into one of the apertures 142 within the alignment fixture 140 and rotated causing the cam 150 to move the clamp 110a along the slot 108 to the desired, or set, location.

Figure 5:
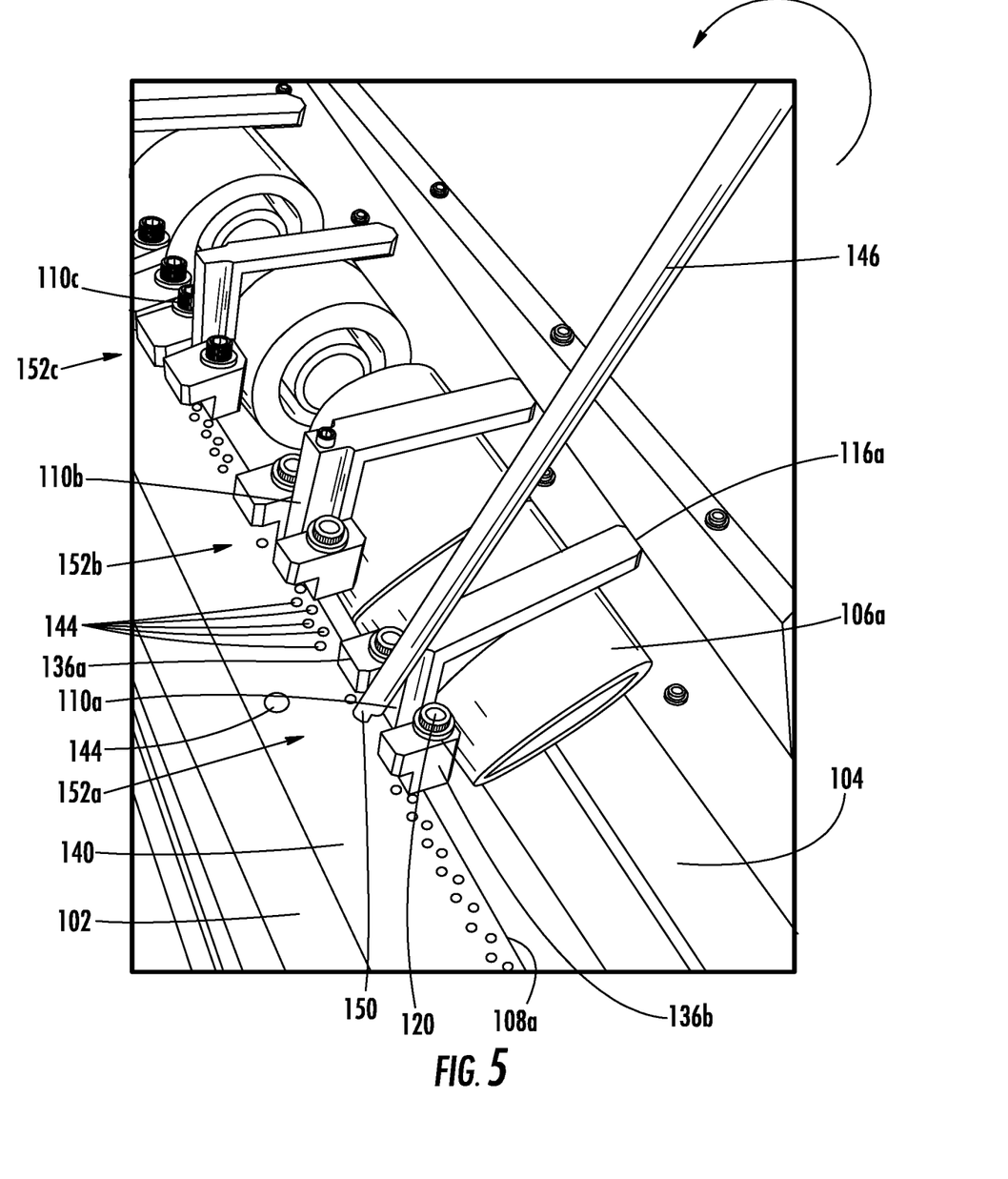
FIG. 5 is a perspective view of the optical system being adjusted using the adjustment tool and alignment fixture of FIG. 4.

As understood with additional reference to FIG. 5, the lower end 118a of the clamp 110a has an adjustment tool receiving passageway 152a therein defined between the two flanges 136a, 136b. In addition, the lower end 118a of the clamp 110a defines an alignment fixture receiving slot 124a (see also FIGS. 2 and 3) with adjacent upper portions of the base 102 as explained above, and the alignment fixture 140 is temporarily or permanently secured to the top surface of the base 102.

The adjustment tool 146 is positioned within the adjustment tool passageway 152a so that the cam 150 engages an adjustment aperture 142. The adjustment tool 146 is rotated using the handle 148 so that the cam 150 contacts the lower end of the clamp 118a and pushes the clamp 110a a relatively precise distance, e.g., a few microns. As a result the optical cell 106a is adjusted to the desired location. The use of the terms desired or set location is generally referring to a location of the lens cell along the groove 104 where the lens cell functions as intended, such as in focusing a beam, for example.

Each of the clamps 110a-110e can be adjusted similarly as shown in FIG. 5. The preloaded fasteners 120 are loosened so that the respective clamp of the optical cell that is to be adjusted will slide. The upper end 116a of the clamp 110a, for example, is secured to the optical cell 106a so that when the clamp is adjusted the result is that the optical cell is also adjusted. Once the preloaded fasteners 120 are tightened, the clamps 110a-110e remain fixed.

Figure 6:
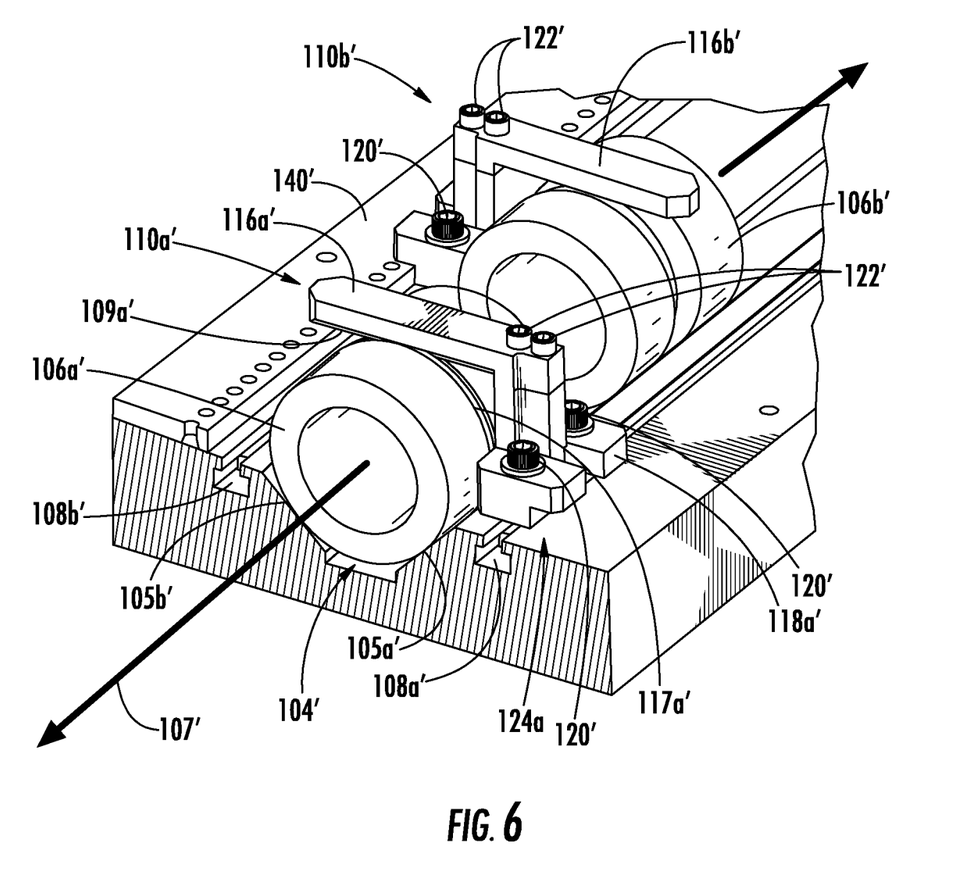
FIG. 6 is a perspective view, partially in section, of another embodiment of the optical system of FIG. 1.

With reference to FIG. 6, another variation of the optical system includes two slots 108a', 108b' on opposite sides of the groove 104'. The other elements are labeled with prime notation and are similar to those described above, and need no further explanation.

Figure 7:
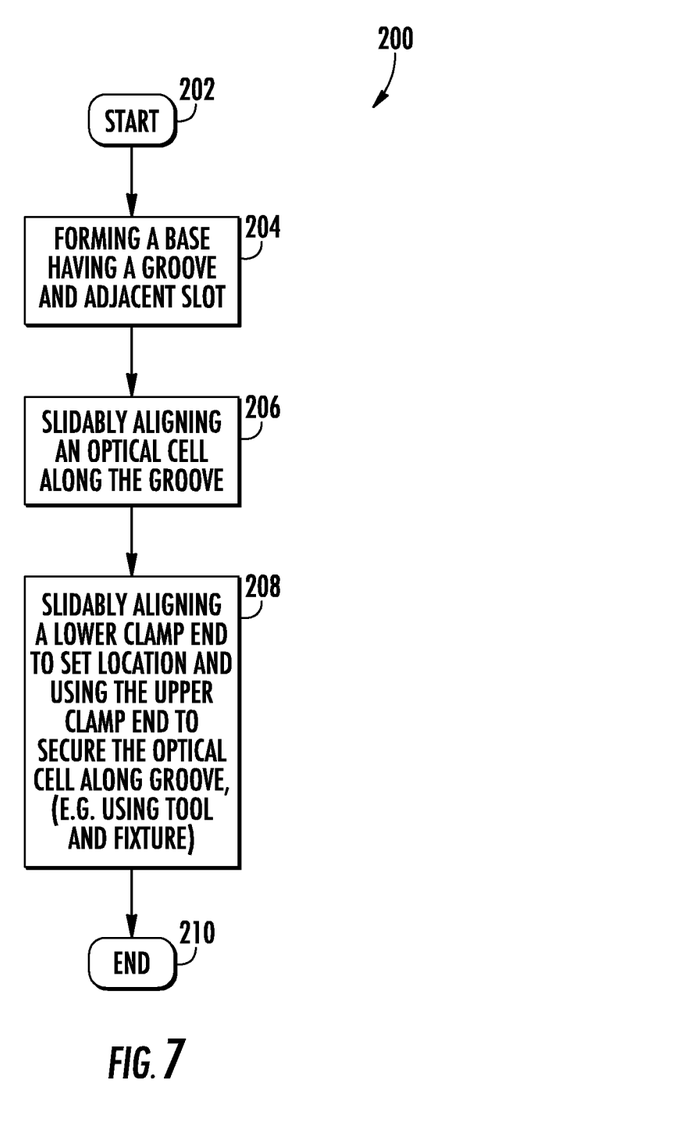
FIG. 7 is a flowchart of a method of making an optical system of FIG. 1.

Referring now to the flowchart 200 of FIG. 7, in accordance with another aspect, a method is for making an optical system as described above. From the start at Block 202 the method includes forming a base having a groove and an adjacent slot therein (Block 204). The groove may have tapered sidewalls and the slot may be parallel with and spaced from the groove. The slot may have an inverted T-shape, for example.

Moving to Block 206, the method includes slidably aligning an optical cell along the groove. At Block 208, the method includes slidably aligning a lower end of a clamp to a set location and using the upper clamp end to secure the optical cell along the groove. Of course, as will be appreciated by those skilled in the art, the aligning of the optical cell and aligning of the lower clamp end may be done simultaneously by taking advantage of the preloaded fastener arrangements as described above. In other embodiments, the optical cell may be roughly aligned first and the clamp used for precise alignment as will be appreciated by those skilled in the art. The optical cell may also be positioned after securing of the lower end of the clamp by removing the upper end of the clamp. The method ends at Block 210.

The method may include using at least one preloaded fastener arrangement of the at least one clamp to secure the lower end of the clamp to the base. The at least one preloaded fastener arrangement may comprise a bolt, a spring biasing the bolt, and a threaded backing plate receiving the bolt. At least one clamp fastener may be used to removably secure the upper end to the lower end.

The at least one lens cell may comprise at least one cylindrical lens cell rotatable within the groove upon loosening of the at least one clamp fastener. In addition, the lower end of the clamp may have an adjustment tool receiving passageway therein and define an alignment fixture receiving slot with adjacent portions of the base. Accordingly, the method may also include using an adjustment tool and an alignment fixture in cooperation with the adjustment tool receiving passageway and alignment fixture receiving slot, respectively, to set the clamp to the desired or set location.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An optical system comprising:
a base having a groove and an adjacent slot therein;
at least one optical cell slidably alignable along the groove; and
at least one clamp comprising a lower end and an upper end, the lower end being slidably alignable along the slot at a set location so that the upper end secures the at least one optical cell along the groove; the at least one clamp further comprising at least one fastener arrangement extending within the slot to secure the lower end of the clamp to the base.

2. The optical system of claim 1 wherein the slot extends parallel to the groove.

3. The optical system of claim 1 wherein the at least one fastener arrangement comprises at least one preloaded fastener arrangement.

4. The optical system of claim 3 wherein the at least one preloaded fastener arrangement comprises a bolt, a spring biasing the bolt, and a threaded backing plate within the slot and receiving the bolt.

5. The optical system of claim 4 wherein the slot has an inverted T shape, and the groove has tapered sidewalls.

6. The optical system of claim 1 wherein the at least one clamp comprises at least one clamp fastener removably securing the upper end to the lower end.

7. The optical system of claim 6 wherein the at least one optical cell comprises at least one cylindrical lens cell rotatable within the groove upon loosening of the at least one clamp fastener.

8. The optical system of claim 1 wherein the lower end of the clamp has an adjustment tool receiving passageway therein.

9. The optical system of claim 1 wherein the lower end of the clamp defines an alignment fixture receiving slot with adjacent portions of the base.

10. An optical system comprising:
a base having a groove and an adjacent slot therein, the groove having tapered sidewalls and the slot extending parallel to the groove;
at least one optical cell slidably alignable along the groove; and
at least one clamp comprising
a lower end and an upper end, the lower end being slidably alignable along the slot and secured at a set location so that the upper end secures the at least one optical cell along the groove, and
at least one preloaded fastener arrangement extending within the slot to secure the lower end of the clamp to the base.

11. The optical system of claim 10 wherein the at least one preloaded fastener arrangement comprises a bolt, a spring biasing the bolt, and a threaded backing plate receiving the bolt.

12. The optical system of claim 10 wherein the slot has an inverted T shape.

13. The optical system of claim 10 wherein the at least one clamp comprises at least one clamp fastener removably securing the upper end to the lower end.

14. The optical system of claim 13 wherein the at least one optical cell comprises at least one cylindrical lens cell rotatable within the groove upon loosening of the at least one clamp fastener.

15. The optical system of claim 10 wherein the lower end of the clamp has an adjustment tool receiving passageway therein.

16. The optical system of claim 10 wherein the lower end of the clamp defines an alignment fixture receiving slot with adjacent portions of the base.

17. A method for making an optical system comprising:
forming a base having a groove and an adjacent slot therein;
slidably aligning at least one optical cell along the groove; and
slidably aligning a lower end of at least one clamp along the slot to a set location and using at least one fastener arrangement extending within the slot to secure the lower end of the clamp to the base so that an upper end of the at least one clamp secures the at least one optical cell along the groove.

18. The method of claim 17 wherein forming the base comprises forming the base so that the slot extends parallel to the groove.

19. The method of claim 17 wherein the at least one fastener arrangement comprises at least one preloaded fastener arrangement.

20. The method of claim 19 wherein the at least one preloaded fastener arrangement comprises a bolt, a spring biasing the bolt, and a threaded backing plate receiving the bolt.

21. The method of claim 17 wherein forming the base comprises forming the base so that the slot has an inverted T shape, and the groove has tapered sidewalls.

22. The method of claim 17 comprising using at least one clamp fastener to removably secure the upper end to the lower end.

23. The method of claim 22 wherein the at least one lens cell comprises at least one cylindrical lens cell rotatable within the groove upon loosening of the at least one clamp fastener.

24. The method of claim 17 wherein the lower end of the clamp has an adjustment tool receiving passageway therein and defines an alignment fixture receiving slot with adjacent portions of the base; and comprising using an adjustment tool and an alignment fixture in cooperation with the adjustment tool receiving passageway and alignment fixture receiving slot, respectively, to set the clamp to the set location.

* * * * *